United States Patent
Wang (10) Patent No.: US 7,740,222 B2
(45) Date of Patent: Jun. 22, 2010

(54) ELECTRONIC DEVICE WITH A HANGING MECHANISM

(76) Inventor: Xian-Jun Wang, No.41-602, Hsintai Garden, Suzhou City, Jiangsu Province (CN)

(*) Notice: Subject to any disclaimer, the term of this patent is extended or adjusted under 35 U.S.C. 154(b) by 448 days.

(21) Appl. No.: 11/294,048

(22) Filed: Dec. 5, 2005

(65) Prior Publication Data

US 2006/0118691 A1 Jun. 8, 2006

(30) Foreign Application Priority Data

Dec. 8, 2004 (TW) .............................. 93138034 A (51) Int. Cl.
*A47G 29/00* (2006.01)
*F16M 11/00* (2006.01)
(52) U.S. Cl. ................ 248/691; 248/692; 248/215; 248/304; 248/307; 248/339; 248/918; 248/496
(58) Field of Classification Search ................ 248/691, 248/692, 215, 227.1, 227.4, 290.1, 304, 307, 248/308, 322, 339, 340, 918, 496, 289.31, 248/610, 611, 613; 211/18
See application file for complete search history.

(56) References Cited

U.S. PATENT DOCUMENTS

| | | | | |
|---|---|---|---|---|
| 658,716 | A * | 9/1900 | Richardson | 248/691 |
| 675,545 | A * | 6/1901 | Hatch | 248/691 |
| 2,288,305 | A * | 6/1942 | Traumuller, Sr. | 248/307 |
| 2,475,442 | A * | 7/1949 | Baum | 223/95 |
| 2,992,854 | A * | 7/1961 | Berlin | 297/256 |
| 3,082,990 | A * | 3/1963 | Nelson | 248/308 |
| 3,329,385 | A * | 7/1967 | Dietsch | 248/290.1 |
| 3,590,951 | A * | 7/1971 | Berger | 182/206 |
| 4,607,773 | A * | 8/1986 | Mason | 224/546 |
| 4,650,144 | A * | 3/1987 | Conrad | 248/290.1 |
| 4,944,434 | A * | 7/1990 | Hamilton | 224/549 |
| 5,044,038 | A * | 9/1991 | Matkovic | 15/159.1 |
| 5,078,276 | A * | 1/1992 | Rogge et al. | 211/18 |
| 5,217,149 | A * | 6/1993 | Simonett | 224/446 |
| 5,375,799 | A * | 12/1994 | Rhodes | 248/95 |
| 5,816,462 | A * | 10/1998 | Brantley | 224/570 |
| 6,065,728 | A * | 5/2000 | Spradlin | 248/309.1 |
| 6,076,716 | A * | 6/2000 | Reyes | 224/482 |
| 6,098,947 | A * | 8/2000 | Kerschner | 248/466 |
| 6,196,509 | B1 * | 3/2001 | Clemens | 248/302 |
| 6,273,279 | B1 * | 8/2001 | Wolf | 211/86.01 |
| 6,439,533 | B2 * | 8/2002 | Armstrong | 248/447.1 |
| 6,511,025 | B1 * | 1/2003 | Corey | 248/96 |

(Continued)

*Primary Examiner*—J. Allen Shriver, II
*Assistant Examiner*—Michael McDuffie
(74) *Attorney, Agent, or Firm*—Perkins Coie LLP (57) ABSTRACT

A hanging electronic device, for hanging on a H thickness wall, comprises a main body and an adjustable hanging mechanism. The adjustable hanging mechanism for mounting the main body on the wall comprises: at least one cantilever bar and an elastic member. The cantilever bar has a first rod, a second rod, a third rod and an elastic member. The first rod has a rotation axis for the cantilever bar to rotate on the main body, and the second rod is coupled to the first rod. The third rod coupled to the second rod is substantially parallel to the first rod. The elastic member is coupled to the first rod. When the cantilever bar rotates relatively to the main body with a rotation angle α, the third rod is firmly against the wall.

24 Claims, 6 Drawing Sheets

U.S. PATENT DOCUMENTS

| | | | |
|---|---|---|---|
| 6,557,807 B1 * | 5/2003 | Belanger | 248/215 |
| 6,575,416 B1 * | 6/2003 | Avinger | 248/307 |
| 6,857,608 B2 * | 2/2005 | Avinger | 248/215 |
| 6,880,793 B2 * | 4/2005 | Huang et al. | 248/304 |
| 7,175,143 B1 * | 2/2007 | Ho | 248/215 |
| 7,232,105 B2 * | 6/2007 | Want et al. | 248/691 |
| 7,252,274 B1 * | 8/2007 | Brannen | 248/301 |
| 2003/0173483 A1 * | 9/2003 | Yeh | 248/287.1 |
| 2007/0080269 A1 * | 4/2007 | Tsai et al. | 248/188.8 |

\* cited by examiner

ELECTRONIC DEVICE WITH A HANGING MECHANISM

This application claims the benefit of Taiwan application Serial No. 93138034, filed Dec. 8, 2004, the subject matter of which is incorporated herein by reference.

BACKGROUND OF THE INVENTION

1. Field of the Invention

The invention relates in general to a hanging electronic device, and more particularly to a hanging electronic device capable of hanging on walls of different thicknesses.

2. Description of the Related Art

Nowadays, user demand keeps growing, not only in the functional aspect of the electronic device should be multiple but also the space of the electronic device occupied should be minimized. For instance, a typical scanner is usually a flatbed scanner. In order to reduce the space that the electronic device occupied and to increase its variety in appearance, a hanging electronic device, such as a hanging scanner, is provided.

Conventionally, the hanging scanner is usually mounted on a partition. Yet, the thickness of the partition needs to be specific since the hanging scanner fails to be fitly mounted on other partitions of different thicknesses. Thus, the flexibility of using the hanging scanner is insufficient. In addition, the hanging stability of the conventional hanging scanner is insufficient either due to the loose structural connection between the partition and the hanging scanner.

SUMMARY OF THE INVENTION

It is therefore an object of the invention to provide a hanging electronic device, which is able to hanging on different thickness walls. Therefore, the diversity of using the electronic device will be increased and so as the flexibility in saving the space.

The invention achieves the above-identified object by providing a hanging electronic device. A hanging electronic device, for hanging on a wall, comprises a main body and an adjustable hanging mechanism. The adjustable hanging mechanism for mounting the main body on the wall comprises: at least one cantilever bar and an elastic member. The cantilever bar has a first rod, a second rod, a third rod and an elastic member. The first rod has a rotation axis for the cantilever bar to pivot on the main body, and the second rod is coupled to the first rod. The third rod coupled to the second rod is substantially parallel to the first rod. The elastic member is coupled to the first rod. When the cantilever bar rotates relatively to the main body with a rotation angle $\alpha$, the third rod is firmly against the wall.

The invention achieves the above-identified object by further providing an adjustable hanging mechanism, which comprises at least one cantilever bar and an elastic member. The cantilever bar comprises a first rod, a second rod and a third rod. The first rod has a rotation axis for the cantilever bar to pivot on the main body, and the second rod is coupled to the first rod. The third rod coupled to the second rod is substantially parallel to the first rod. The elastic member is coupled to the first rod. When the cantilever bar rotates relatively to the main body with a rotation angle $\alpha$, the third rod is firmly against the wall.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
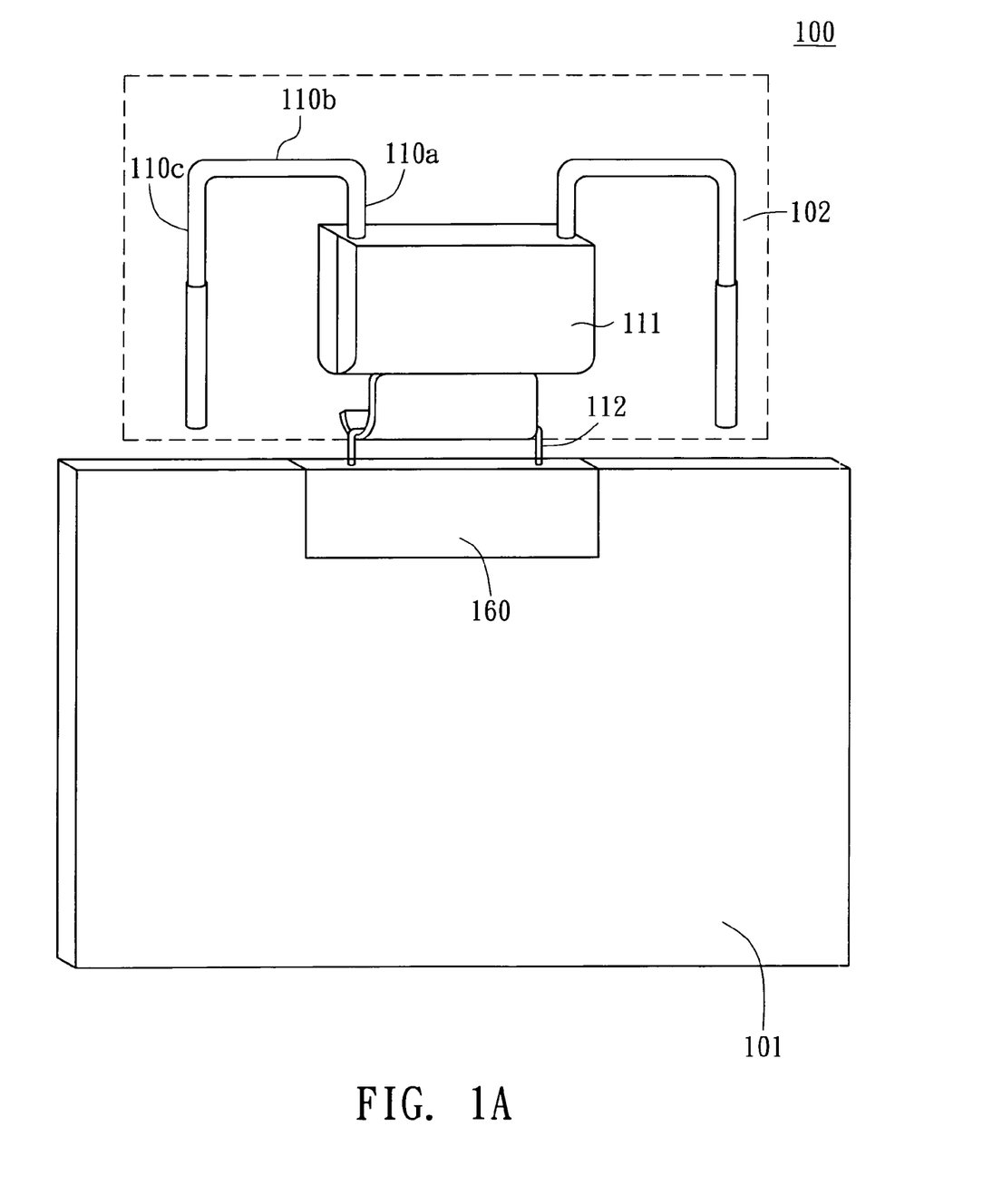
FIG. 1A is a rear perspective view of a hanging electronic device.
Figure 1B:
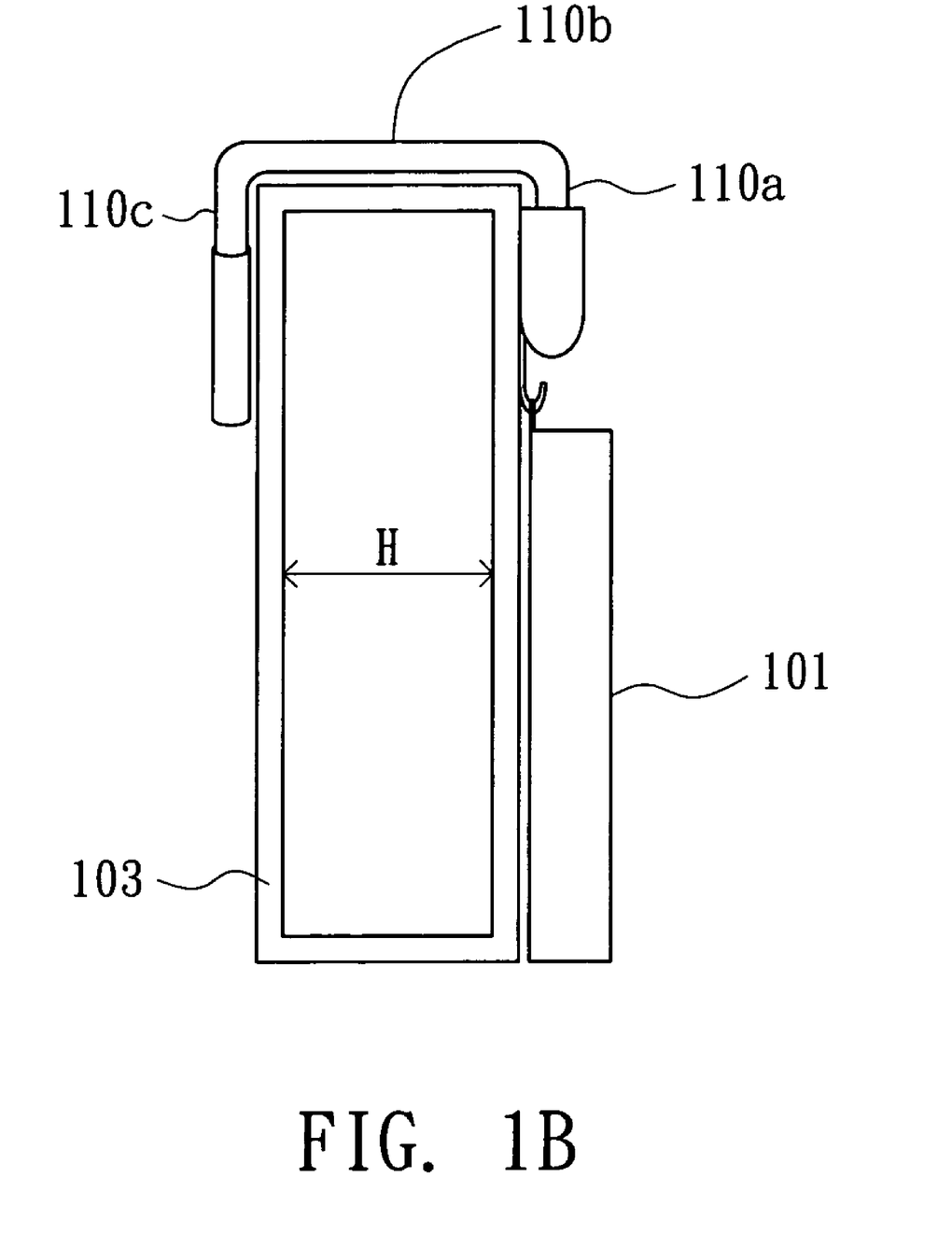
FIG. 1B is a side view of a hanging electronic device hanging on the wall.

Referring to FIG. 1A, a rear perspective view of a hanging electronic device is shown. The hanging electronic device 100 such as a hanging electronic scanner includes a main body 101 and an adjustable hanging mechanism 102. Referring to FIG. 1B, a side view of a hanging electronic device hanging on the wall is shown. The main body 101 is hung on a wall 103 by means of the adjustable hanging mechanism 102. The wall 103 such as a partition has a wall with H thickness.

Figure 1C:
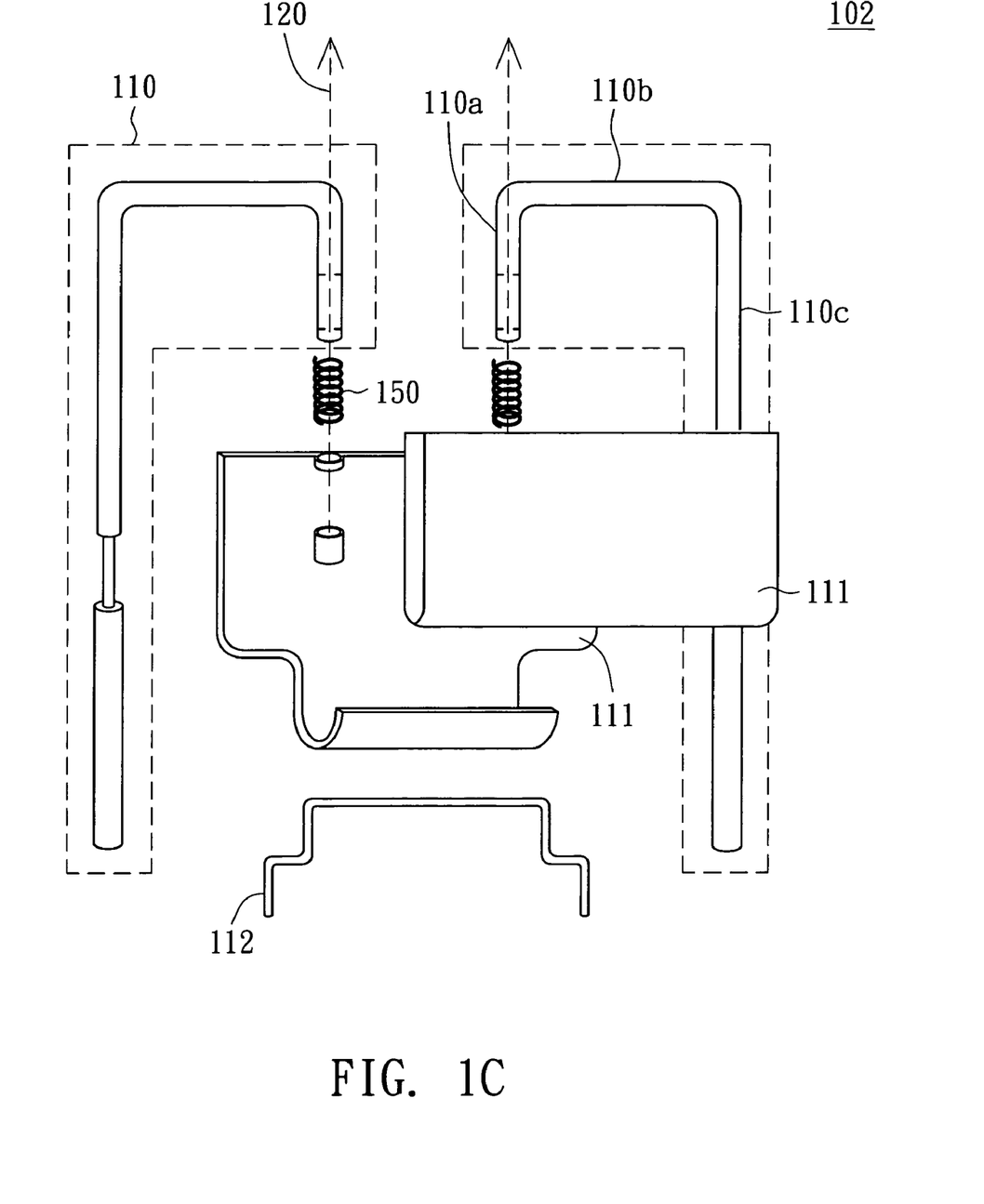
FIG. 1C is an exploded view of the adjustable hanging mechanism.

Referring to both of FIG. 1A and FIG. 1C, FIG. 1C is an exploded view of the adjustable hanging mechanism. The adjustable hanging mechanism 102 includes two cantilever bars 110, an elastic member 150, a box 111 and a rotation rod 112. The two cantilever bars 110 have a first rod 110a, a second rod 110b and a third rod 110c. The first rod 110a has a rotation axis 120 for the cantilever bar 120 to pivot on the main body 101. The second rod 110b is coupled to the first rod 110a, and the third rod 110c coupled to the second rod 110b is parallel to the first rod 110a. The elastic member 150, such as a torsion spring, coupled to the first rod 110a by one end and secured in the box 111 by the other end. When the cantilever bar 110 rotates relatively to the main body 101, the elastic member 150 then provides the restoring force to the cantilever bar 110. Thus, the cantilever bar 110 is firmly against the wall 103. The box 111 is used to receive the cantilever bars 110 and the elastic member 150.

Figure 2A:
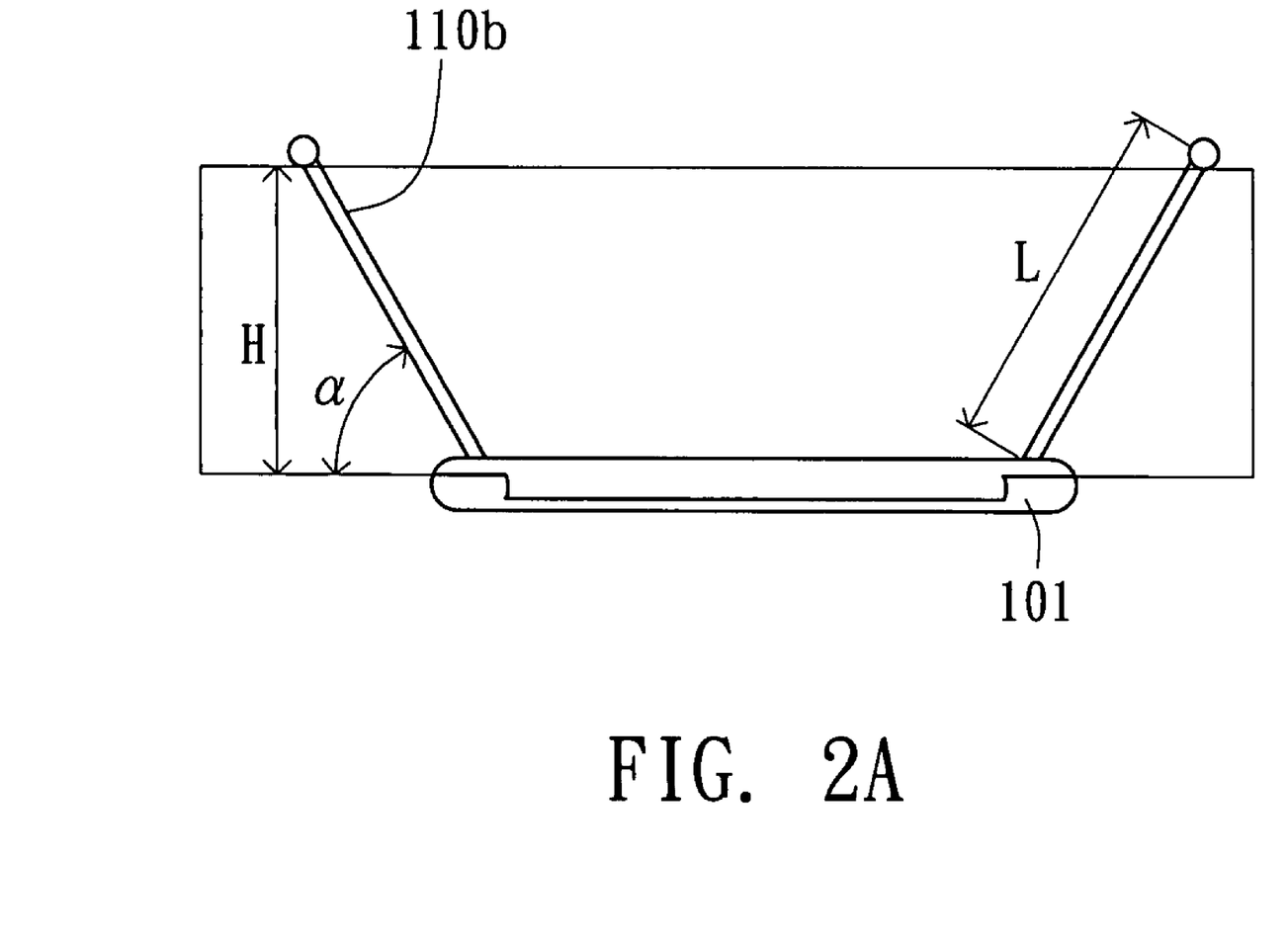
FIG. 2A is a top view of the electronic device hanging on the wall.

Referring to FIG. 1A and FIG. 2A, FIG. 2A is a top view of the electronic device hanging on the wall. When the second rod 110b rotates an angle $\alpha$, the distance between the third rod 110c and the main body 101 is substantially equals to the wall with H thickness. As shown in FIG. 2A, the length of the second rod 110b is L, the wall thickness is H and the rotation angle is $\alpha$. The formula between the wall thickness H, the length L and the rotation angle is $H = L * \sin \alpha$.

Figure 2B:
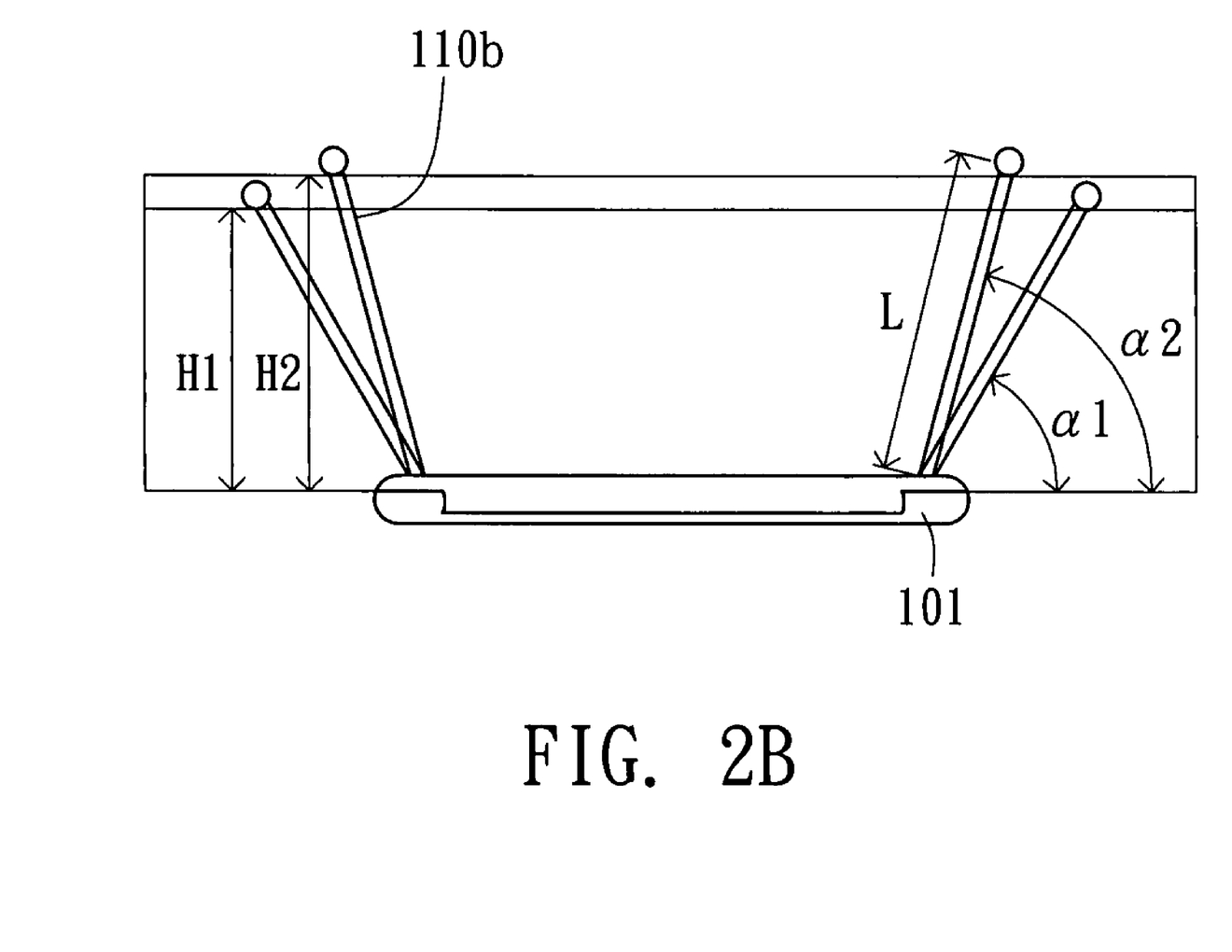
FIG. 2B is a schematic view of the electronic device hanging on walls with different thicknesses.

Referring to FIG. 2B, a schematic view of the electronic device hanging on walls with different thicknesses is shown. Suppose the length of the second rod 110b is fixed and the wall thickness is H1, the second rod 110b needs to rotate an angle $\alpha_1$ accordingly; suppose the wall thickness is H2, the second rod 110b needs to rotate an angle $\alpha_2$ accordingly. That is, under constant length L of the second rod 110b, as the wall thickness H increases, the depending rotation angle needs to increase as well. On the contrary, the less the wall thickness H is, the less rotation angle $\alpha$ is needed. According to the trigonometric function, 1 is the largest value of $\sin \alpha$. Thus, the largest thickness H of the second rod 110b equals the length L.

Figure 3:
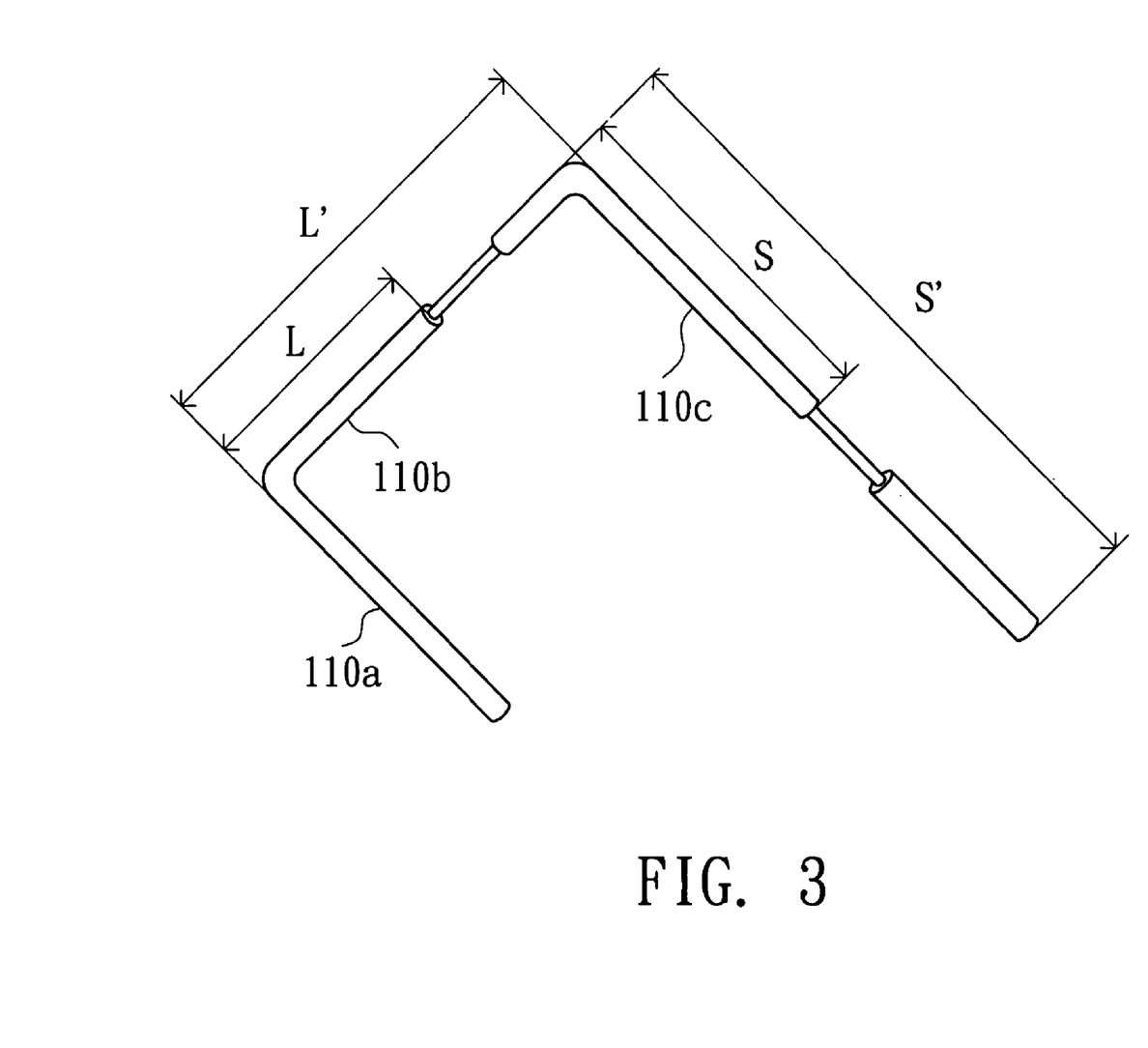
FIG. 3 is a schematic view of how the second rod and the third rod stretch.

Referring to FIG. 3, a schematic view of the second rod and the third rod stretch is shown. The cantilever bars 110 include the first rod 110a, the second rod 110b and the third rod 110c.

The second rod 110b and the third rod 110c are both stretchable. The stretchability of the second rod 110b makes the length L to vary with the wall thickness H to increase the adaptability in different environment. If the wall thickness H is larger than the length of the second rod 110b, the length of the second rod 110b could be adjusted from L to L', which L' is no less than the wall with H thickness. Besides, due to the length of the third rod 110c is able to adjust, the friction force between the third rod 110c and the wall 103 can be increased to support the weight of the electronic device. As shown in FIG. 3, the initial length of the third rod 110c is S, when the cantilever bars 110 could not hold the main body 101, the length of the third rod 110c can be adjusted from S to S' to increase the friction force between the third rod 110c and the wall 103. Moreover, when the second rod 110b is at L's length, the friction force between the second rod 110b and the wall 103 could be additionally provided.

As shown in FIG. 1A, the main body has a receiving chamber 160. When the box 111 is closed relatively to the main body 101, the box 111 is received in a receiving chamber 160. The rotation rod 112 can be substituted by a track or a slot to facilitate user to store the adjustable hanging mechanism. By using the rotation rod 112 relatively closed or opened to the main body 101, the space can be saved, the track and the slot can save the space too by leading the box 111 to relatively slide in the track or the slot.

The hanging electronic device disclosed in the above embodiment can be hung on wall with different thicknesses, thereby increasing the diversity of applying the electronic device. Besides, the electronic device having a chamber for receiving the adjustable hanging mechanism saves the space and increase the portability of the electronic device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adjustable hanging mechanism for mounting a main body of an electronic device on a wall, the adjustable hanging mechanism comprising:
    at least one cantilever bar, comprising;
        a first rod having a rotation axis for the cantilever bar to pivot on the main body;
        a second rod coupled to the first rod; and
        a third rod coupled to the second rod and substantially parallel to the first rod;
    an elastic member coupled to the first rod, wherein the elastic member is configured to provide a restoring force to the cantilever bar after the cantilever bar rotates relative to the main body, and wherein the third rod is configured to firmly engage the wall based, at least in part, on the restoring force;
    a box configured to receive the cantilever bar and the elastic member; and
    a rotation rod releasably carried by the box and configured to rotatably couple the box to the main body of the electronic device.

2. The mechanism of claim 1 wherein the mechanism comprises two symmetrical cantilever bars.

3. The mechanism of claim 1 wherein the wall comprises a thickness H, and wherein the second rod is stretchable to have an adjustable length L, and further wherein the length L is equal to or greater than the thickness H.

4. The mechanism of claim 1 wherein the third rod is stretchable to adjust a friction force between the third rod and the wall.

5. The mechanism of claim 1 wherein the elastic member comprises a torsion spring.

6. The mechanism of claim 1 wherein the electronic product comprises a scanner.

7. An assembly, comprising:
    a scanner comprising a main body; and
    an adjustable hanging mechanism configured to mount the scanner to a wall, the hanging mechanism comprising
    a pair of cantilever bars, the individual cantilever bars comprising:
        a first rod having a rotation axis about which the cantilever bar pivots relative to the main body;
        a second rod coupled to the first rod; and
        a third rod coupled to the second rod and substantially parallel to the first rod; and
    an elastic member coupled to the first rod, wherein the elastic member is configured to drive the cantilever bar toward a first, inital position after the cantilever bar is pivoted relative to the main body a rotation angle α to a second position, and wherein the driving force of the elastic member is configured to drive the third rod against the wall;
    a box for receiving the cantilever bar and the elastic member; and
    a rotation rod releasably carried by the box and configured to rotatably couple the box to the main body of the scanner.

8. The assembly of claim 7 wherein the pair of cantilever bars comprise symmetrical cantilever bars.

9. The assembly of claim 7 wherein the wall has a thickness H, and wherein the second rod of each of the cantilever bars is configured to extend to a length greater than or equal to the thickness H of the wall.

10. The assembly device of claim 7 wherein a length of the individual third rods is adjustable to adjust a friction force between the corresponding third rod and the wall.

11. The device of claim 7, wherein the elastic member is a torsion spring.

12. The mechanism of claim 1 wherein the rotation rod is substantially perpendicular to the first rod.

13. The mechanism of claim 1 wherein the second rod is substantially perpendicular to at least one of the first rod or the third rod.

14. The mechanism of claim 1 wherein the elastic member is positioned within the box.

15. The mechanism of claim 1 wherein the box further comprises a connector that receives the rotation rod.

16. The mechanism of claim 1 wherein the first rod, the second rod, and the third rod are integral.

17. The assembly of claim 7 wherein the box at least partially receives the cantilever bar, and wherein a portion of the cantilever bar extends from the box.

18. An assembly for hanging an electronic device from a wall, the assembly comprising:
    a box with a slot for releasably attaching the box to the electronic device;
    a first cantilever bar and a second cantilever bar, wherein the individual cantilever bars comprise a first rod, a second rod coupled to the first rod, and a third rod coupled to the second rod, and wherein the first rod is configured to rotate relative to the box;
    means for biasing the first and second cantilever bars toward a first position in which an angle between the first cantilever bar and the second cantilever bar is approximately 180 degrees, wherein the first cantilever bar and the second cantilever bar are configured to rotate away from the first position into a second position in which the angle between the first and second cantilever bars is less than approximately 180 degrees such that the first and second cantilever bars are configured to engage a wall when in the second position.

19. The assembly of claim 18 wherein when the first and second cantilever bars are in the second position the angle between the first cantilever bar and the second cantilever bar is θ, and wherein θ is related to a length of the second cantilever bar, L, and a width of the wall, H, by the equation: $\theta = 180° - 2\sin^{-1}(H/L)$.

20. The assembly of claim 18 wherein the first rod and the third rod are substantially parallel.

21. The assembly of claim 18 wherein at least one of the first rod, the second rod, and the third rod are extensible.

22. The assembly of claim 18 wherein the means for biasing comprises a spring.

23. The assembly of claim 18 wherein the first and second cantilever bars comprise two symmetrical, inverted U-shaped members.

24. The assembly of claim 18 wherein the slot comprises a track.

* * * * *